United States Patent
Richardson et al.

(10) Patent No.: US 8,386,596 B2
(45) Date of Patent: *Feb. 26, 2013

(54) REQUEST ROUTING BASED ON CLASS

(75) Inventors: David R. Richardson, Seattle, WA (US);
Swaminathan Sivasubramanian, Seattle, WA (US); Bradley E. Marshall, Bainbridge Island, WA (US); Christopher L. Scofield, Seattle, WA (US); Elmore Eugene Pope, Sammamish, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/418,239

(22) Filed: Mar. 12, 2012

(65) Prior Publication Data

US 2012/0215914 A1    Aug. 23, 2012

Related U.S. Application Data

(63) Continuation of application No. 13/098,366, filed on Apr. 29, 2011, now Pat. No. 8,135,820, which is a continuation of application No. 12/060,173, filed on Mar. 31, 2008, now Pat. No. 7,962,597.

(51) Int. Cl.
*G06F 15/173* (2006.01)

(52) U.S. Cl. ......... 709/223; 709/217; 709/219; 709/224

(58) Field of Classification Search .................. 709/223, 709/224, 229, 203, 217, 219
See application file for complete search history.

(56) References Cited

U.S. PATENT DOCUMENTS

| | | | | |
|---|---|---|---|---|
| 5,341,477 A | * | 8/1994 | Pitkin et al. | ............. 709/226 |
| 5,611,049 A | | 3/1997 | Pitts | |
| 5,774,660 A | * | 6/1998 | Brendel et al. | ............. 709/201 |
| 5,892,914 A | | 4/1999 | Pitts | |
| 6,016,512 A | | 1/2000 | Huitema | |
| 6,026,452 A | | 2/2000 | Pitts | |

(Continued)

FOREIGN PATENT DOCUMENTS

| | | |
|---|---|---|
| CN | 1422468 A | 6/2003 |
| WO | WO 2007/007960 A1 | 1/2007 |

(Continued)

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

(Continued)

*Primary Examiner* — Lashonda Jacobs
(74) *Attorney, Agent, or Firm* — Knobbe, Martens, Olson & Bear, LLP

(57) ABSTRACT

A system and method for management and processing of resource requests is provided. A content delivery network service provider receives a DNS query from a client computing device. The DNS query corresponds to a requested resource from the client computing device. The content delivery network service provider associates the client computing device with a cluster of other client computing devices. Based on routing information for the cluster, the content delivery network service provider routes the DNS query. The process can further include monitoring performance data associated with the delivery of the requested resource and updating the routing information for the cluster based on the performance data for use in processing subsequent requests from client computing devices in the cluster.

24 Claims, 10 Drawing Sheets

U.S. PATENT DOCUMENTS

| | | | |
|---|---|---|---|
| 6,052,718 | A | 4/2000 | Gifford |
| 6,085,234 | A | 7/2000 | Pitts et al. |
| 6,098,096 | A | 8/2000 | Tsirigotis et al. |
| 6,108,703 | A | 8/2000 | Leighton et al. |
| 6,182,111 | B1 | 1/2001 | Inohara et al. |
| 6,185,598 | B1 | 2/2001 | Farber et al. |
| 6,192,051 | B1 | 2/2001 | Lipman et al. |
| 6,205,475 | B1 | 3/2001 | Pitts |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |
| 6,374,290 | B1 | 4/2002 | Scharber et al. |
| 6,415,280 | B1 | 7/2002 | Farber et al. |
| 6,457,047 | B1 | 9/2002 | Chandra et al. |
| 6,484,143 | B1 | 11/2002 | Swildens et al. |
| 6,505,241 | B2 | 1/2003 | Pitts |
| 6,553,413 | B1 | 4/2003 | Leighton et al. |
| 6,560,610 | B1 | 5/2003 | Eatherton et al. |
| 6,654,807 | B2 | 11/2003 | Farber et al. |
| 6,658,462 | B1 | 12/2003 | Dutta |
| 6,678,791 | B1 | 1/2004 | Jacobs et al. |
| 6,694,358 | B1 | 2/2004 | Swildens et al. |
| 6,732,237 | B1 | 5/2004 | Jacobs et al. |
| 6,754,699 | B2 | 6/2004 | Swildens et al. |
| 6,754,706 | B1 | 6/2004 | Swildens et al. |
| 6,769,031 | B1 | 7/2004 | Bero |
| 6,785,704 | B1 | 8/2004 | McCanne |
| 6,804,706 | B2 | 10/2004 | Pitts |
| 6,829,654 | B1 | 12/2004 | Jungck |
| 6,874,017 | B1 | 3/2005 | Inoue et al. |
| 6,963,850 | B1 | 11/2005 | Bezos et al. |
| 6,981,017 | B1 | 12/2005 | Kasriel et al. |
| 6,986,018 | B2 | 1/2006 | O'Rourke et al. |
| 6,990,526 | B1 | 1/2006 | Zhu |
| 6,996,616 | B1 | 2/2006 | Leighton et al. |
| 7,003,555 | B1 | 2/2006 | Jungck |
| 7,006,099 | B2 | 2/2006 | Gut et al. |
| 7,007,089 | B2 | 2/2006 | Freedman |
| 7,010,578 | B1 | 3/2006 | Lewin et al. |
| 7,010,598 | B2 | 3/2006 | Sitaraman et al. |
| 7,032,010 | B1 | 4/2006 | Swildens et al. |
| 7,058,706 | B1 | 6/2006 | Iyer et al. |
| 7,058,953 | B2 | 6/2006 | Willard et al. |
| 7,065,587 | B2 | 6/2006 | Huitema et al. |
| 7,072,982 | B2 | 7/2006 | Teodosiu et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,099,936 | B2 | 8/2006 | Chase et al. |
| 7,103,645 | B2* | 9/2006 | Leighton et al. ............... 709/219 |
| 7,117,262 | B2 | 10/2006 | Bai et al. |
| 7,133,905 | B2* | 11/2006 | Dilley et al. ................ 709/219 |
| 7,143,169 | B1 | 11/2006 | Champagne et al. |
| 7,146,560 | B2 | 12/2006 | Dang et al. |
| 7,149,809 | B2 | 12/2006 | Barde et al. |
| 7,152,118 | B2 | 12/2006 | Anderson, IV et al. |
| 7,174,382 | B2 | 2/2007 | Ramanathan et al. |
| 7,185,063 | B1 | 2/2007 | Kasriel et al. |
| 7,188,214 | B1 | 3/2007 | Kasriel et al. |
| 7,194,522 | B1 | 3/2007 | Swildens et al. |
| 7,200,667 | B2 | 4/2007 | Teodosiu et al. |
| 7,225,254 | B1 | 5/2007 | Swildens et al. |
| 7,228,350 | B2 | 6/2007 | Hong et al. |
| 7,233,978 | B2 | 6/2007 | Overton et al. |
| 7,240,100 | B1* | 7/2007 | Wein et al. ................... 709/214 |
| 7,254,636 | B1 | 8/2007 | O'Toole, Jr. et al. |
| 7,260,598 | B1 | 8/2007 | Liskov et al. |
| 7,269,784 | B1 | 9/2007 | Kasriel et al. |
| 7,289,519 | B1 | 10/2007 | Liskov |
| 7,293,093 | B2 | 11/2007 | Leighton |
| 7,310,686 | B2* | 12/2007 | Uysal .......................... 709/245 |
| 7,316,648 | B2 | 1/2008 | Kelly et al. |
| 7,320,131 | B1 | 1/2008 | O'Toole, Jr. |
| 7,321,918 | B2 | 1/2008 | Burd et al. |
| 7,363,291 | B1 | 4/2008 | Page |
| 7,441,045 | B2 | 10/2008 | Skene et al. |
| 7,461,170 | B1* | 12/2008 | Taylor et al. .................. 709/245 |
| 7,464,142 | B2 | 12/2008 | Flurry et al. |
| 7,492,720 | B2 | 2/2009 | Pruthi et al. |
| 7,499,998 | B2 | 3/2009 | Toebes et al. |
| 7,502,836 | B1* | 3/2009 | Menditto et al. ............... 709/217 |
| 7,519,720 | B2 | 4/2009 | Fishman et al. |
| 7,548,947 | B2 | 6/2009 | Kasriel et al. |
| 7,552,235 | B2* | 6/2009 | Chase et al. .................. 709/238 |
| 7,565,407 | B1 | 7/2009 | Hayball |
| 7,573,916 | B1 | 8/2009 | Bechtolsheim et al. |
| 7,624,169 | B2 | 11/2009 | Lisiecki et al. |
| 7,650,376 | B1 | 1/2010 | Blumenau |
| 7,653,700 | B1 | 1/2010 | Bahl et al. |
| 7,657,622 | B1 | 2/2010 | Douglis et al. |
| 7,680,897 | B1 | 3/2010 | Carter et al. |
| 7,702,724 | B1 | 4/2010 | Brydon et al. |
| 7,706,740 | B2 | 4/2010 | Collins et al. |
| 7,707,314 | B2 | 4/2010 | McCarthy et al. |
| 7,716,367 | B1 | 5/2010 | Leighton et al. |
| 7,725,602 | B2 | 5/2010 | Liu et al. |
| 7,739,400 | B2 | 6/2010 | Lindbo et al. |
| 7,747,720 | B2 | 6/2010 | Toebes et al. |
| 7,756,913 | B1 | 7/2010 | Day |
| 7,761,572 | B1 | 7/2010 | Auerbach |
| 7,769,823 | B2 | 8/2010 | Jenny et al. |
| 7,773,596 | B1 | 8/2010 | Marques |
| 7,774,342 | B1 | 8/2010 | Virdy |
| 7,792,989 | B2 | 9/2010 | Toebes et al. |
| 7,809,597 | B2 | 10/2010 | Das et al. |
| 7,813,308 | B2 | 10/2010 | Reddy et al. |
| 7,818,454 | B2 | 10/2010 | Kim et al. |
| 7,836,177 | B2 | 11/2010 | Kasriel et al. |
| 7,904,875 | B2 | 3/2011 | Hegyi |
| 7,912,921 | B2 | 3/2011 | O'Rourke et al. |
| 7,925,782 | B2 | 4/2011 | Sivasubramanian et al. |
| 7,930,393 | B1 | 4/2011 | Baumback et al. |
| 7,930,427 | B2 | 4/2011 | Josefsberg et al. |
| 7,962,597 | B2* | 6/2011 | Richardson et al. .......... 709/223 |
| 7,966,404 | B2 | 6/2011 | Hedin et al. |
| 7,991,910 | B2 | 8/2011 | Richardson et al. |
| 7,996,535 | B2 | 8/2011 | Auerbach |
| 8,000,724 | B1 | 8/2011 | Rayburn et al. |
| 8,028,090 | B2 | 9/2011 | Richardson et al. |
| 8,065,275 | B2 | 11/2011 | Eriksen et al. |
| 8,073,940 | B1 | 12/2011 | Richardson et al. |
| 8,082,348 | B1 | 12/2011 | Averbuj et al. |
| 8,117,306 | B1 | 2/2012 | Baumback et al. |
| 8,122,098 | B1 | 2/2012 | Richardson et al. |
| 2001/0032133 | A1 | 10/2001 | Moran |
| 2001/0034704 | A1 | 10/2001 | Farhat et al. |
| 2001/0049741 | A1* | 12/2001 | Skene et al. .................. 709/232 |
| 2001/0056416 | A1 | 12/2001 | Garcia-Luna-Aceves |
| 2001/0056500 | A1 | 12/2001 | Farber et al. |
| 2002/0007413 | A1 | 1/2002 | Garcia-Luna-Aceves et al. |
| 2002/0048269 | A1 | 4/2002 | Hong et al. |
| 2002/0049608 | A1 | 4/2002 | Hartsell et al. |
| 2002/0052942 | A1 | 5/2002 | Swildens et al. |
| 2002/0062372 | A1 | 5/2002 | Hong et al. |
| 2002/0068554 | A1 | 6/2002 | Dusse |
| 2002/0069420 | A1 | 6/2002 | Russell et al. |
| 2002/0078233 | A1 | 6/2002 | Biliris et al. |
| 2002/0083118 | A1 | 6/2002 | Sim |
| 2002/0083148 | A1 | 6/2002 | Shaw et al. |
| 2002/0087374 | A1 | 7/2002 | Boubez et al. |
| 2002/0092026 | A1 | 7/2002 | Janniello et al. |
| 2002/0099616 | A1 | 7/2002 | Sweldens |
| 2002/0099850 | A1 | 7/2002 | Farber et al. |
| 2002/0101836 | A1 | 8/2002 | Dorenbosch |
| 2002/0116481 | A1 | 8/2002 | Lee |
| 2002/0124098 | A1 | 9/2002 | Shaw |
| 2002/0129123 | A1 | 9/2002 | Johnson et al. |
| 2002/0138286 | A1* | 9/2002 | Engstrom ........................ 705/1 |
| 2002/0138437 | A1 | 9/2002 | Lewin et al. |
| 2002/0147770 | A1 | 10/2002 | Tang |
| 2002/0156911 | A1 | 10/2002 | Croman et al. |

| | | | | | |
|---|---|---|---|---|---|
| 2002/0163882 A1 | 11/2002 | Bornstein et al. | 2006/0037037 A1 | 2/2006 | Miranz |
| 2002/0188722 A1 | 12/2002 | Banerjee et al. | 2006/0047787 A1 | 3/2006 | Agarwal et al. |
| 2003/0002484 A1 | 1/2003 | Freedman | 2006/0063534 A1 | 3/2006 | Kokkonen et al. |
| 2003/0009591 A1 | 1/2003 | Hayball et al. | 2006/0064500 A1 | 3/2006 | Roth et al. |
| 2003/0037139 A1 | 2/2003 | Shteyn | 2006/0069808 A1 | 3/2006 | Mitchell et al. |
| 2003/0065739 A1 | 4/2003 | Shnier | 2006/0074750 A1 | 4/2006 | Clark et al. |
| 2003/0074401 A1 | 4/2003 | Connell et al. | 2006/0075084 A1 | 4/2006 | Lyon |
| 2003/0099202 A1 | 5/2003 | Lear et al. | 2006/0075139 A1 | 4/2006 | Jungck |
| 2003/0101278 A1 | 5/2003 | Garcia-Luna-Aceves et al. | 2006/0083165 A1 | 4/2006 | McLane et al. |
| 2003/0133554 A1 | 7/2003 | Nykanen et al. | 2006/0112176 A1 | 5/2006 | Liu et al. |
| 2003/0135509 A1 | 7/2003 | Davis et al. | 2006/0120385 A1 | 6/2006 | Atchison et al. |
| 2003/0140087 A1 | 7/2003 | Lincoln et al. | 2006/0143293 A1 | 6/2006 | Freedman |
| 2003/0145066 A1 | 7/2003 | Okada et al. | 2006/0155823 A1 | 7/2006 | Tran et al. |
| 2003/0149581 A1 | 8/2003 | Chaudhri et al. | 2006/0161541 A1 | 7/2006 | Cencini |
| 2003/0163722 A1 | 8/2003 | Anderson, IV | 2006/0168088 A1 | 7/2006 | Leighton et al. |
| 2003/0172183 A1 | 9/2003 | Anderson, IV et al. | 2006/0190605 A1 | 8/2006 | Franz et al. |
| 2003/0174648 A1 | 9/2003 | Wang et al. | 2006/0193247 A1 | 8/2006 | Naseh et al. |
| 2003/0182413 A1 | 9/2003 | Allen et al. | 2006/0195866 A1 | 8/2006 | Thukral |
| 2003/0187935 A1 | 10/2003 | Agarwalla et al. | 2006/0230137 A1 | 10/2006 | Gare et al. |
| 2003/0187970 A1 | 10/2003 | Chase et al. | 2006/0233155 A1 | 10/2006 | Srivastava |
| 2003/0191822 A1 | 10/2003 | Leighton et al. | 2006/0253546 A1 | 11/2006 | Chang et al. |
| 2003/0204602 A1 | 10/2003 | Hudson et al. | 2006/0253609 A1 | 11/2006 | Andreev et al. |
| 2003/0229682 A1 | 12/2003 | Day | 2006/0259984 A1 | 11/2006 | Juneau |
| 2003/0233423 A1 | 12/2003 | Dilley et al. | 2006/0265508 A1 | 11/2006 | Angel et al. |
| 2003/0236700 A1 | 12/2003 | Arning et al. | 2006/0265516 A1 | 11/2006 | Schilling |
| 2004/0010621 A1 | 1/2004 | Afergan et al. | 2006/0265720 A1 | 11/2006 | Cai et al. |
| 2004/0019518 A1 | 1/2004 | Abraham et al. | 2006/0271641 A1 | 11/2006 | Stavrakos et al. |
| 2004/0024841 A1 | 2/2004 | Becker et al. | 2006/0282522 A1 | 12/2006 | Lewin et al. |
| 2004/0030620 A1 | 2/2004 | Benjamin et al. | 2007/0005689 A1 | 1/2007 | Leighton et al. |
| 2004/0034744 A1 | 2/2004 | Karlsson et al. | 2007/0005892 A1 | 1/2007 | Mullender et al. |
| 2004/0039798 A1 | 2/2004 | Hotz et al. | 2007/0011267 A1 | 1/2007 | Overton et al. |
| 2004/0044791 A1 | 3/2004 | Pouzzner | 2007/0014241 A1 | 1/2007 | Banerjee et al. |
| 2004/0073596 A1 | 4/2004 | Kloninger et al. | 2007/0038994 A1 | 2/2007 | Davis et al. |
| 2004/0073867 A1 | 4/2004 | Kausik et al. | 2007/0041393 A1 | 2/2007 | Westhead et al. |
| 2004/0078468 A1 | 4/2004 | Hedin et al. | 2007/0043859 A1 | 2/2007 | Ruul |
| 2004/0078487 A1 | 4/2004 | Cernohous et al. | 2007/0050522 A1 | 3/2007 | Grove et al. |
| 2004/0083307 A1 | 4/2004 | Uysal | 2007/0055764 A1 | 3/2007 | Dilley et al. |
| 2004/0117455 A1 | 6/2004 | Kaminksy et al. | 2007/0076872 A1 | 4/2007 | Juneau |
| 2004/0128344 A1* | 7/2004 | Trossen .................. 709/203 | 2007/0094361 A1 | 4/2007 | Hoynowski et al. |
| 2004/0128346 A1 | 7/2004 | Melamed et al. | 2007/0101377 A1 | 5/2007 | Six et al. |
| 2004/0167981 A1 | 8/2004 | Douglas et al. | 2007/0118667 A1 | 5/2007 | McCarthy et al. |
| 2004/0172466 A1 | 9/2004 | Douglas et al. | 2007/0118668 A1 | 5/2007 | McCarthy et al. |
| 2004/0194085 A1 | 9/2004 | Beaubien et al. | 2007/0134641 A1 | 6/2007 | Lieu |
| 2004/0203630 A1 | 10/2004 | Wang | 2007/0168517 A1 | 7/2007 | Weller |
| 2004/0205149 A1 | 10/2004 | Dillon et al. | 2007/0174426 A1 | 7/2007 | Swildens et al. |
| 2004/0205162 A1 | 10/2004 | Parikh | 2007/0174442 A1 | 7/2007 | Sherman et al. |
| 2004/0215823 A1 | 10/2004 | Kleinfelter et al. | 2007/0183342 A1 | 8/2007 | Wong et al. |
| 2004/0249971 A1 | 12/2004 | Klinker | 2007/0208737 A1* | 9/2007 | Li et al. .................. 707/6 |
| 2004/0249975 A1 | 12/2004 | Tuck et al. | 2007/0219795 A1 | 9/2007 | Park et al. |
| 2004/0267906 A1 | 12/2004 | Truty | 2007/0220010 A1 | 9/2007 | Ertugrul |
| 2004/0267907 A1 | 12/2004 | Gustafsson | 2007/0244964 A1 | 10/2007 | Challenger et al. |
| 2005/0010653 A1 | 1/2005 | McCanne | 2007/0250467 A1 | 10/2007 | Mesnik et al. |
| 2005/0021706 A1 | 1/2005 | Maggi et al. | 2007/0250560 A1 | 10/2007 | Wein et al. |
| 2005/0038967 A1 | 2/2005 | Umbehocker et al. | 2007/0266113 A1 | 11/2007 | Koopmans et al. |
| 2005/0044270 A1 | 2/2005 | Grove et al. | 2007/0266311 A1 | 11/2007 | Westphal |
| 2005/0108169 A1 | 5/2005 | Balasubramanian et al. | 2007/0266333 A1 | 11/2007 | Cossey et al. |
| 2005/0108529 A1 | 5/2005 | Juneau | 2007/0271385 A1 | 11/2007 | Davis et al. |
| 2005/0114296 A1 | 5/2005 | Farber et al. | 2007/0280229 A1 | 12/2007 | Kenney |
| 2005/0132083 A1 | 6/2005 | Raciborski et al. | 2007/0288588 A1 | 12/2007 | Wein et al. |
| 2005/0157712 A1 | 7/2005 | Rangarajan et al. | 2008/0005057 A1 | 1/2008 | Ozzie et al. |
| 2005/0171959 A1 | 8/2005 | Deforche et al. | 2008/0008089 A1 | 1/2008 | Bornstein et al. |
| 2005/0188073 A1 | 8/2005 | Nakamichi et al. | 2008/0025304 A1 | 1/2008 | Venkataswami et al. |
| 2005/0192008 A1 | 9/2005 | Desai et al. | 2008/0046596 A1 | 2/2008 | Afergan et al. |
| 2005/0216569 A1 | 9/2005 | Coppola et al. | 2008/0065724 A1 | 3/2008 | Seed et al. |
| 2005/0216674 A1 | 9/2005 | Robbin et al. | 2008/0065745 A1 | 3/2008 | Leighton et al. |
| 2005/0232165 A1 | 10/2005 | Brawn et al. | 2008/0071859 A1 | 3/2008 | Seed et al. |
| 2005/0259672 A1 | 11/2005 | Eduri | 2008/0071987 A1 | 3/2008 | Karn et al. |
| 2005/0262248 A1 | 11/2005 | Jennings, III et al. | 2008/0072264 A1 | 3/2008 | Crayford |
| 2005/0267991 A1 | 12/2005 | Huitema et al. | 2008/0082551 A1 | 4/2008 | Farber et al. |
| 2005/0267992 A1 | 12/2005 | Huitema et al. | 2008/0086574 A1 | 4/2008 | Raciborski et al. |
| 2005/0267993 A1 | 12/2005 | Huitema et al. | 2008/0103805 A1 | 5/2008 | Shear et al. |
| 2005/0278259 A1* | 12/2005 | Gunaseelan et al. ............ 705/59 | 2008/0104268 A1 | 5/2008 | Farber et al. |
| 2006/0013158 A1 | 1/2006 | Ahuja et al. | 2008/0114829 A1 | 5/2008 | Button et al. |
| 2006/0020596 A1 | 1/2006 | Liu et al. | 2008/0134043 A1 | 6/2008 | Georgis et al. |
| 2006/0020684 A1 | 1/2006 | Mukherjee et al. | 2008/0147866 A1 | 6/2008 | Stolorz et al. |
| 2006/0020715 A1 | 1/2006 | Jungck | 2008/0147873 A1 | 6/2008 | Matsumoto |
| 2006/0026067 A1 | 2/2006 | Nicholas et al. | 2008/0155061 A1 | 6/2008 | Afergan et al. |
| 2006/0026154 A1 | 2/2006 | Altinel et al. | 2008/0155614 A1 | 6/2008 | Cooper et al. |
| 2006/0036720 A1 | 2/2006 | Faulk, Jr. | 2008/0162667 A1 | 7/2008 | Verma et al. |

| | | | |
|---|---|---|---|
| 2008/0189437 A1 | 8/2008 | Halley | |
| 2008/0201332 A1 | 8/2008 | Souders et al. | |
| 2008/0215718 A1 | 9/2008 | Stolorz et al. | |
| 2008/0215735 A1 | 9/2008 | Farber et al. | |
| 2008/0215750 A1 | 9/2008 | Farber et al. | |
| 2008/0222281 A1 | 9/2008 | Dilley et al. | |
| 2008/0222291 A1 | 9/2008 | Weller et al. | |
| 2008/0222295 A1 | 9/2008 | Robinson et al. | |
| 2008/0228920 A1 | 9/2008 | Souders et al. | |
| 2008/0235400 A1 | 9/2008 | Slocombe et al. | |
| 2008/0275772 A1 | 11/2008 | Suryanarayana et al. | |
| 2008/0281950 A1 | 11/2008 | Wald et al. | |
| 2008/0288722 A1 | 11/2008 | Lecoq et al. | |
| 2008/0301670 A1* | 12/2008 | Gouge et al. | 717/173 |
| 2008/0319862 A1 | 12/2008 | Golan et al. | |
| 2009/0013063 A1 | 1/2009 | Soman | |
| 2009/0016236 A1 | 1/2009 | Alcala et al. | |
| 2009/0029644 A1 | 1/2009 | Sue et al. | |
| 2009/0031367 A1 | 1/2009 | Sue | |
| 2009/0031368 A1 | 1/2009 | Ling | |
| 2009/0031376 A1 | 1/2009 | Riley et al. | |
| 2009/0049098 A1 | 2/2009 | Pickelsimer et al. | |
| 2009/0070533 A1 | 3/2009 | Elazary et al. | |
| 2009/0086741 A1 | 4/2009 | Zhang | |
| 2009/0103707 A1 | 4/2009 | McGary et al. | |
| 2009/0106381 A1 | 4/2009 | Kasriel et al. | |
| 2009/0112703 A1 | 4/2009 | Brown | |
| 2009/0125934 A1 | 5/2009 | Jones et al. | |
| 2009/0132368 A1 | 5/2009 | Cotter et al. | |
| 2009/0132648 A1 | 5/2009 | Swildens et al. | |
| 2009/0144412 A1 | 6/2009 | Ferguson et al. | |
| 2009/0150926 A1 | 6/2009 | Schlack | |
| 2009/0157850 A1 | 6/2009 | Gagliardi et al. | |
| 2009/0158163 A1 | 6/2009 | Stephens et al. | |
| 2009/0164331 A1 | 6/2009 | Bishop et al. | |
| 2009/0177667 A1 | 7/2009 | Ramos et al. | |
| 2009/0182815 A1 | 7/2009 | Czechowski et al. | |
| 2009/0182945 A1 | 7/2009 | Aviles et al. | |
| 2009/0187575 A1 | 7/2009 | DaCosta | |
| 2009/0204682 A1 | 8/2009 | Jeyaseelan et al. | |
| 2009/0210549 A1* | 8/2009 | Hudson et al. | 709/231 |
| 2009/0248787 A1 | 10/2009 | Sivasubramanian et al. | |
| 2009/0248852 A1 | 10/2009 | Fuhrmann et al. | |
| 2009/0248858 A1 | 10/2009 | Sivasubramanian et al. | |
| 2009/0248893 A1 | 10/2009 | Richardson et al. | |
| 2009/0259971 A1 | 10/2009 | Rankine et al. | |
| 2009/0271577 A1 | 10/2009 | Campana et al. | |
| 2009/0271730 A1 | 10/2009 | Rose et al. | |
| 2009/0279444 A1 | 11/2009 | Ravindran et al. | |
| 2009/0287750 A1 | 11/2009 | Banavar et al. | |
| 2009/0307307 A1 | 12/2009 | Igarashi | |
| 2010/0005175 A1* | 1/2010 | Swildens et al. | 709/226 |
| 2010/0011061 A1 | 1/2010 | Hudson et al. | |
| 2010/0023601 A1 | 1/2010 | Lewin et al. | |
| 2010/0030662 A1 | 2/2010 | Klein | |
| 2010/0036944 A1 | 2/2010 | Douglis et al. | |
| 2010/0088367 A1 | 4/2010 | Brown et al. | |
| 2010/0100629 A1 | 4/2010 | Raciborski et al. | |
| 2010/0111059 A1 | 5/2010 | Bappu et al. | |
| 2010/0121953 A1 | 5/2010 | Friedman et al. | |
| 2010/0122069 A1 | 5/2010 | Gonion | |
| 2010/0150155 A1 | 6/2010 | Napierala | |
| 2010/0192225 A1 | 7/2010 | Ma et al. | |
| 2010/0217801 A1 | 8/2010 | Leighton et al. | |
| 2010/0226372 A1 | 9/2010 | Watanabe | |
| 2010/0257566 A1 | 10/2010 | Matila | |
| 2010/0293479 A1 | 11/2010 | Rousso et al. | |
| 2010/0299439 A1 | 11/2010 | McCarthy et al. | |
| 2010/0332595 A1 | 12/2010 | Fullagar et al. | |
| 2011/0078000 A1 | 3/2011 | Ma et al. | |
| 2011/0078230 A1 | 3/2011 | Sepulveda | |
| 2011/0153941 A1 | 6/2011 | Spatscheck et al. | |
| 2011/0238501 A1 | 9/2011 | Almeida | |
| 2011/0252142 A1 | 10/2011 | Richardson et al. | |
| 2011/0258049 A1 | 10/2011 | Ramer et al. | |
| 2011/0276623 A1 | 11/2011 | Girbal | |
| 2012/0066360 A1 | 3/2012 | Ghosh | |
| 2012/0179839 A1 | 7/2012 | Raciborski et al. | |

FOREIGN PATENT DOCUMENTS

WO    WO 2012/044587 A1    4/2012

OTHER PUBLICATIONS

Singapore Examination Report in Application No. 201006837-7 mailed May 16, 2012.

International Search Report and Written Opinion in PCT/US2011/061486 mailed Mar. 30, 2012 in 11 pages.

Baglioni et al., "Preprocessing and Mining Web Log Data for Web Personalization", LNAI 2829, 2003, pp. 237-249.

International Search Report and Written Opinion in PCT/US2011/053302 mailed Nov. 28, 2011 in 11 pages.

Liu et al., "Combined mining of Web server logs and web contents for classifying user navigation patterns and predicting users' future requests," Data & Knowledge Engineering 61 (2007) pp. 304-330.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

First Office Action in Chinese Application No. 200980119993.1 dated Jul. 4, 2012.

First Office Action in Chinese Application No. 200980119995.0 dated Jul. 6, 2012.

* cited by examiner

REQUEST ROUTING BASED ON CLASS

CROSS REFERENCE TO RELATED APPLICATIONS

This application is a continuation of U.S. patent application Ser. No. 13/098,366, now U.S. Pat. No. 8,135,820, filed Apr. 29, 2011, entitled "REQUEST ROUTING BASED ON CLASS," which is in turn a continuation of U.S. patent application Ser. No. 12/060,173, filed on Mar. 31, 2008, entitled "REQUEST ROUTING BASED ON CLASS" which is now U.S. Pat. No. 7,962,597, issued on Jun. 14, 2011, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the management and processing of resource requests made to a content delivery network ("CDN") service provider from client computing devices. Specifically, aspects of the disclosure will be described with regard to routing information associated with a resource request based on routing information for a cluster of client computing devices. Although various aspects of the disclosure will be described with regard to illustrative examples and embodiments, one skilled in the art will appreciate that the disclosed embodiments and examples should not be construed as limiting.

Figure 1:
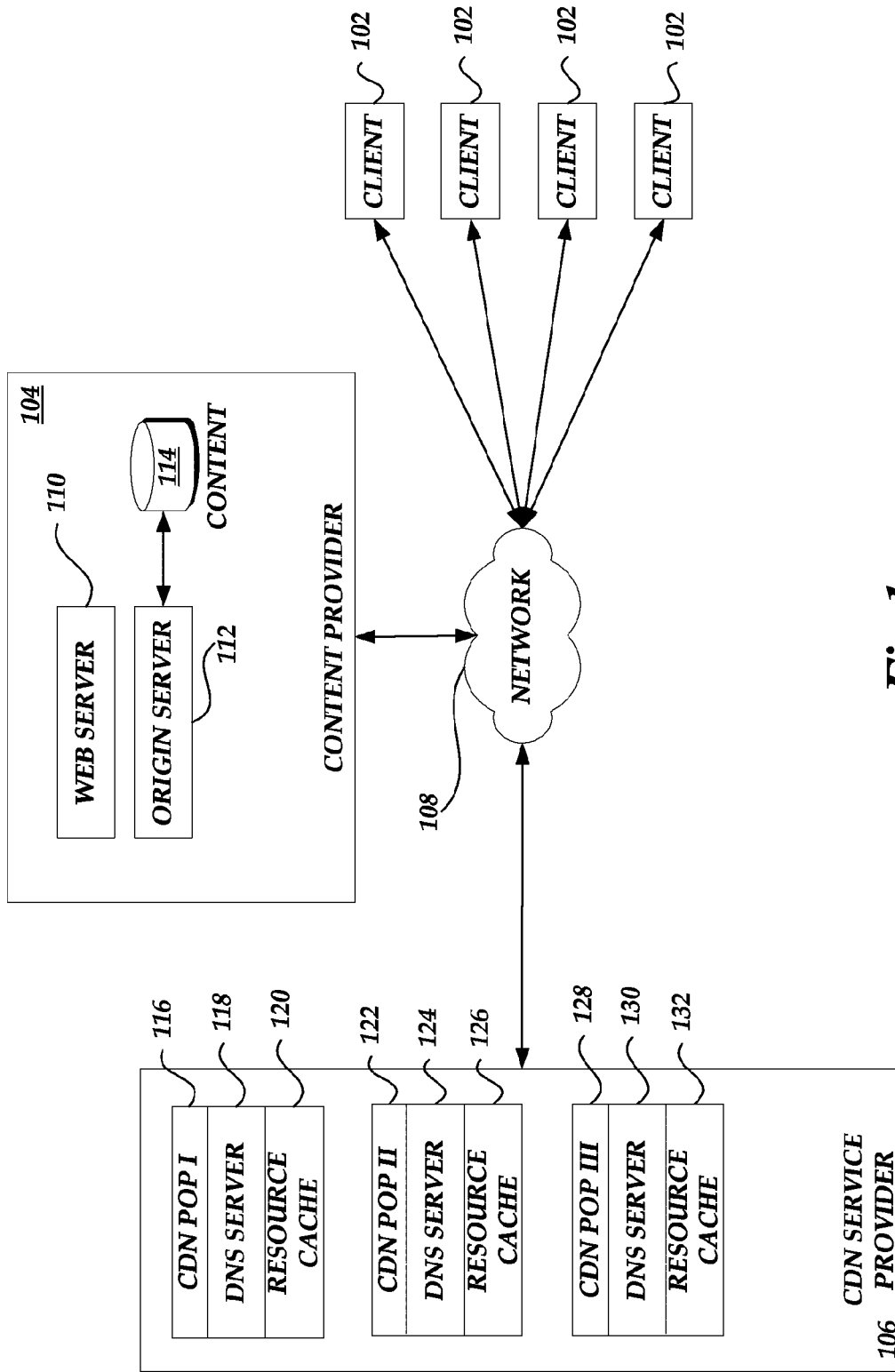
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
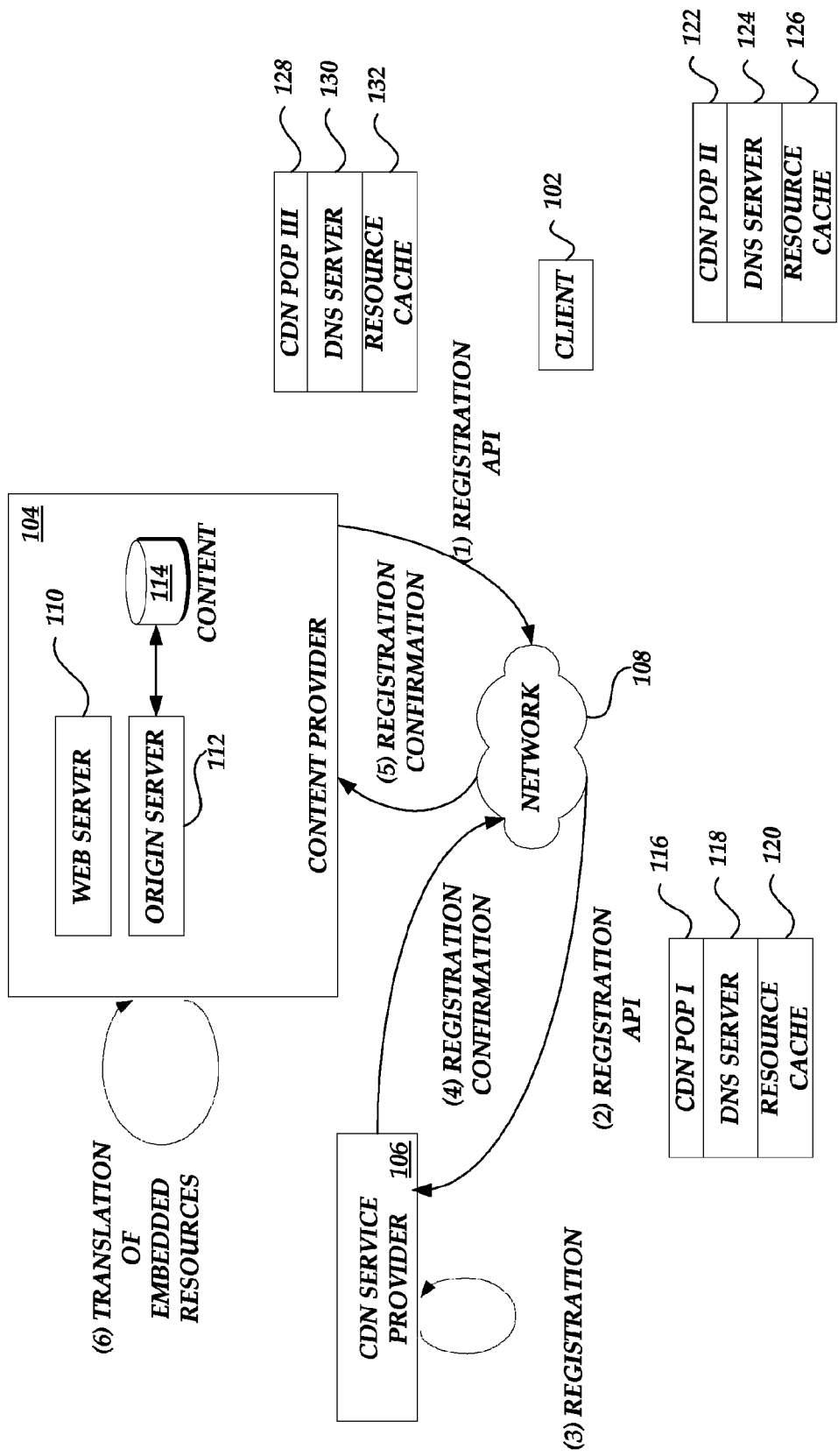
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional information.cdnprovider.com/path/resources.xxx

Figure 3:
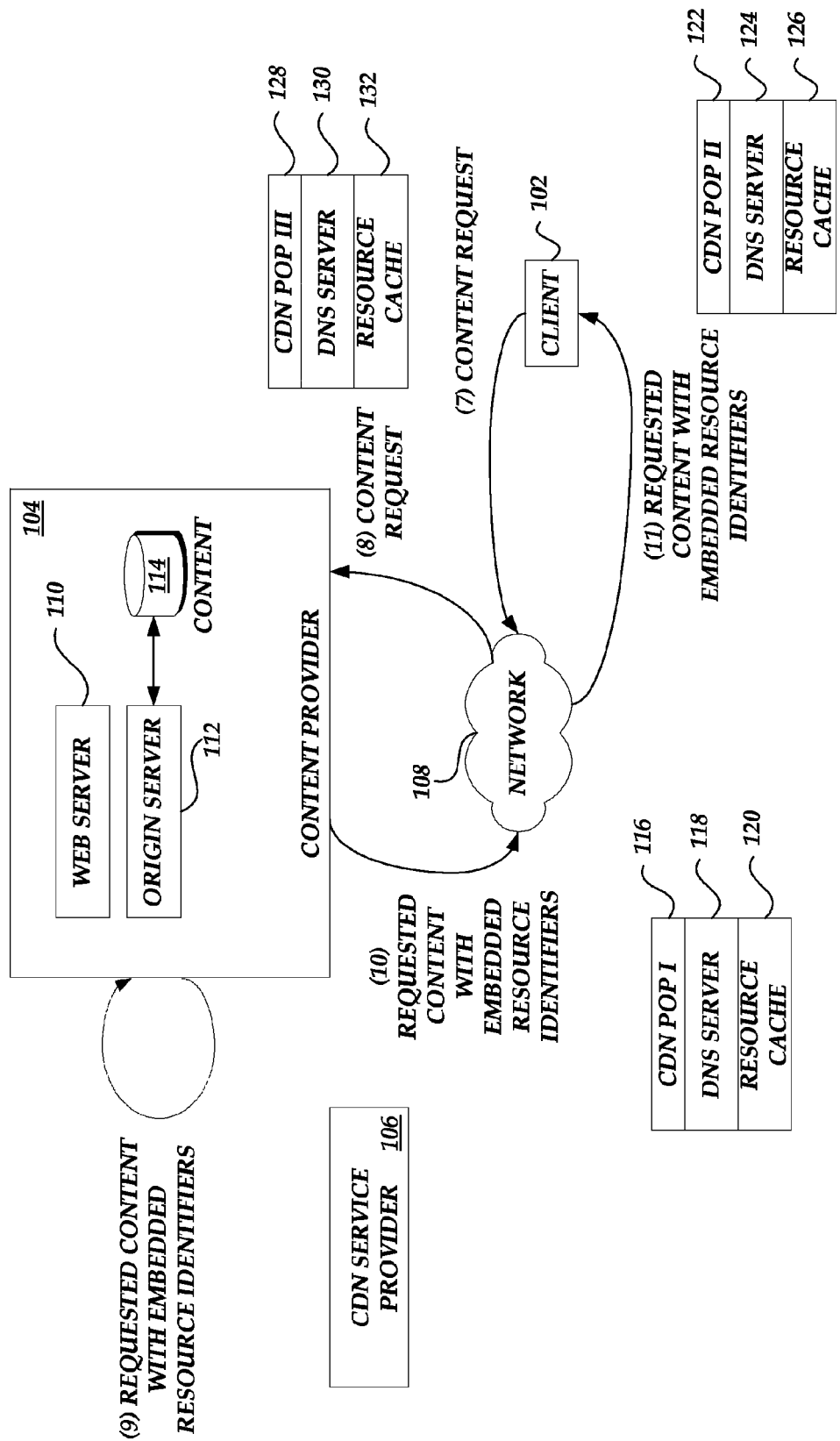
FIG. 3 is a block diagram of the content delivery environment of FIG. 1 illustrating the generation and processing of a content request from a client computing device to a content provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additional information.cdnprovider.com /www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the Original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
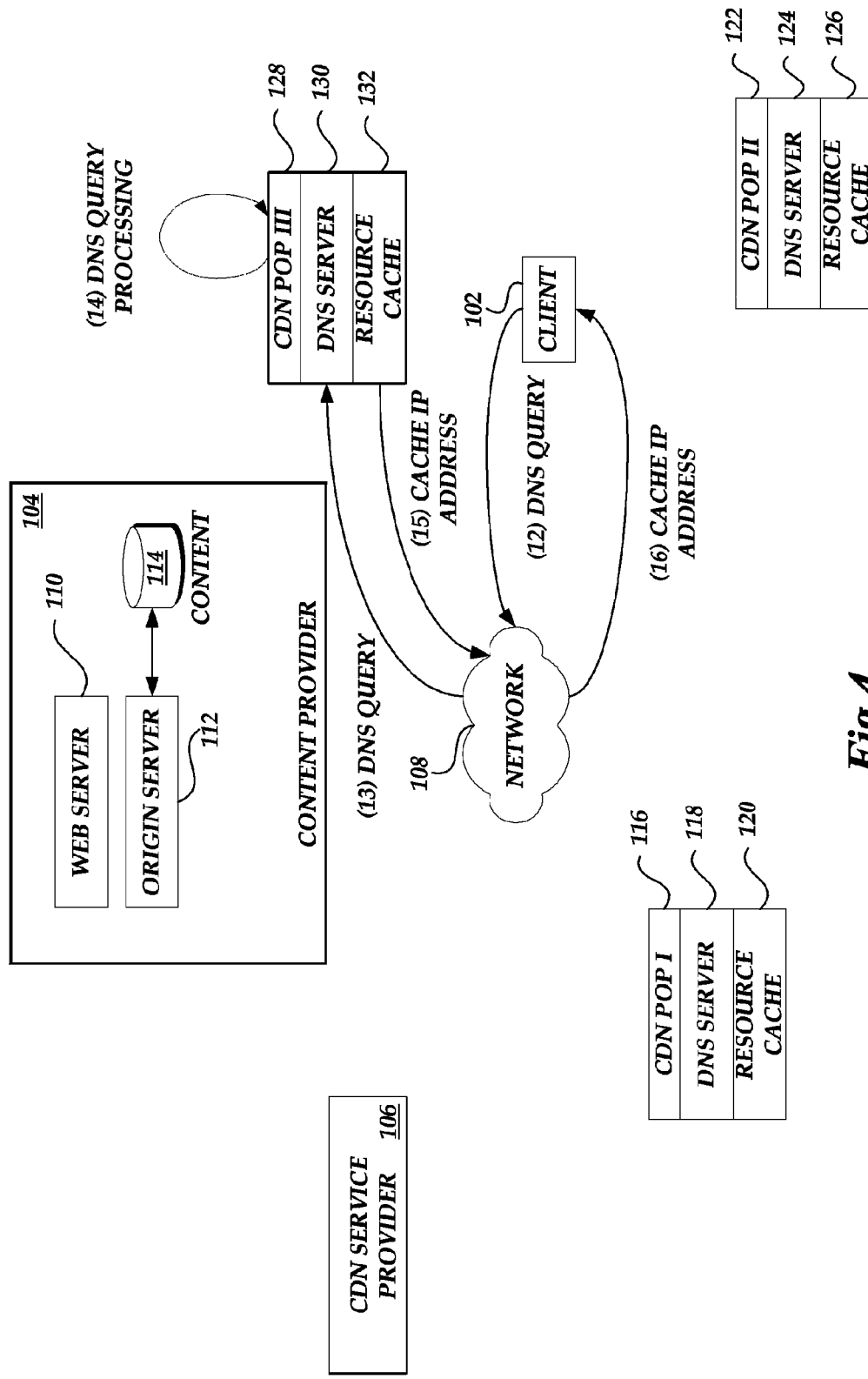
FIG. 4 is a block diagram of the content delivery environment of FIG. 1 illustrating one embodiment of the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying an IP address of a cache server component that will process the request for the requested resource. As described above and as will be described further below in reference to FIG. 6, a selected resource cache component can process the request by either providing the requested resource if it is available or attempt to obtain the requested resource from another source, such as a peer cache server computing device or the origin server 112 of the content provider 104.

In further reference to FIG. 4, the specific DNS server can utilize a variety of information in selecting a resource cache component. In an illustrative embodiment, and as will be further described below in reference to FIGS. 7 and 8, the DNS server determines a class associated with the requesting client computing device. For example, the class can correspond to a specific geographic region to which the client computing device belongs or an internet service provider for the client computing device. Such class information can be determined from the client directly (such as information provided by the client computing device or ISP) or indirectly (such as inferred through a client computing device's IP address). Based on the class, the DNS server determines appropriate routing information. Then, for embodiments described specifically in reference to FIG. 4, the DNS server selects an appropriate resource cache component for providing content associated with the resource request based on the routing information for the determined class of the client computing device. The IP address selected by the DNS server may correspond to a specific caching server in the resource cache. Alternatively, the IP address can correspond to a hardware/software selection component (such as a load balancer). As will also be further described below, the DNS server can further utilize network performance measurements to assist in selecting specific resource cache components for the determined class.

Figure 5A:
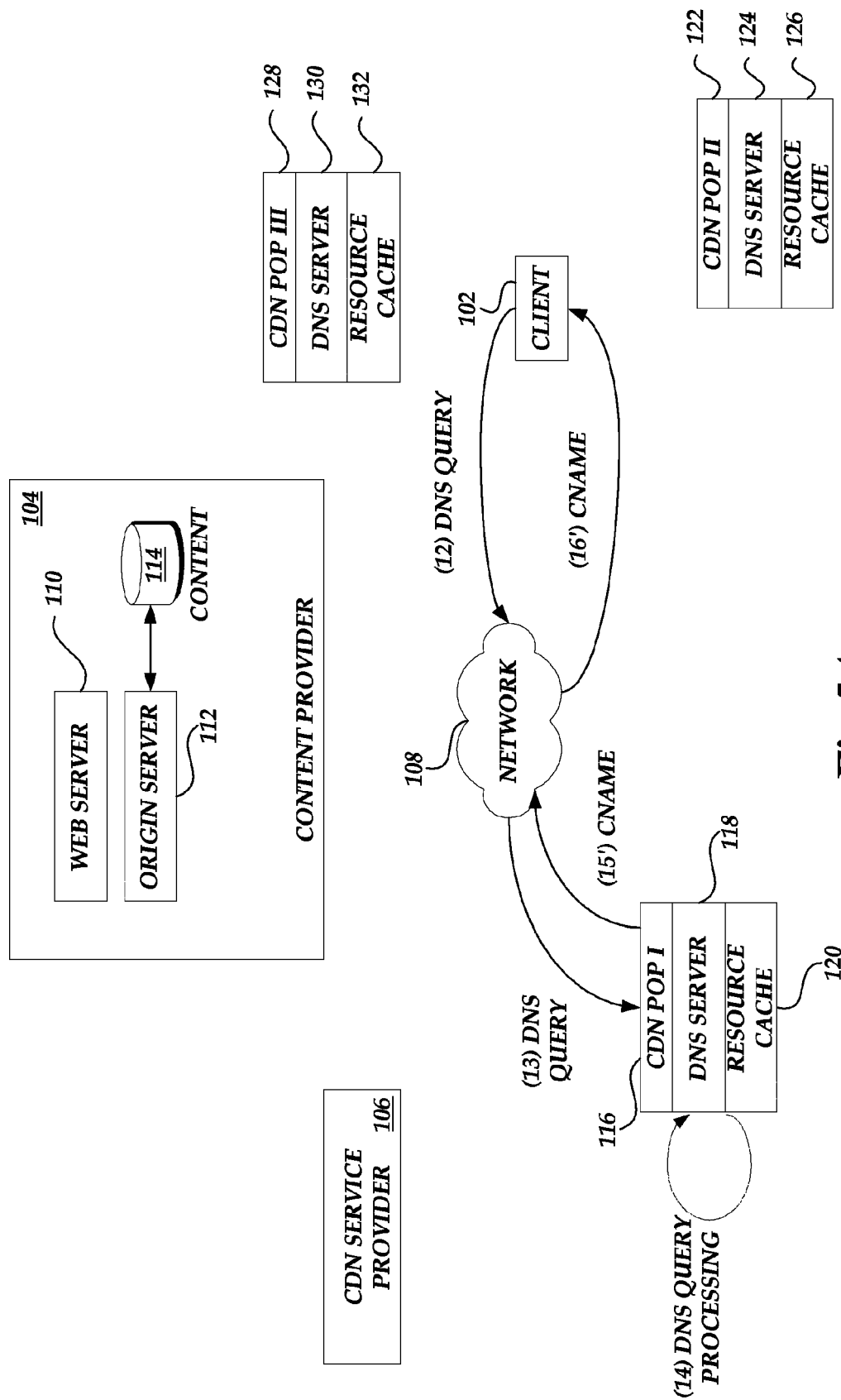
FIGS. 5A-5C are block diagrams of the content delivery environment of FIG. 1 illustrating another embodiment of the generation and processing of a DNS query corresponding to an embedded resource from a client computing device to a content delivery network service provider and the subsequent generation and processing of DNS queries corresponding to a first and a second alternative resource identifier from a client computing device to a content delivery network.
Figure 5B:
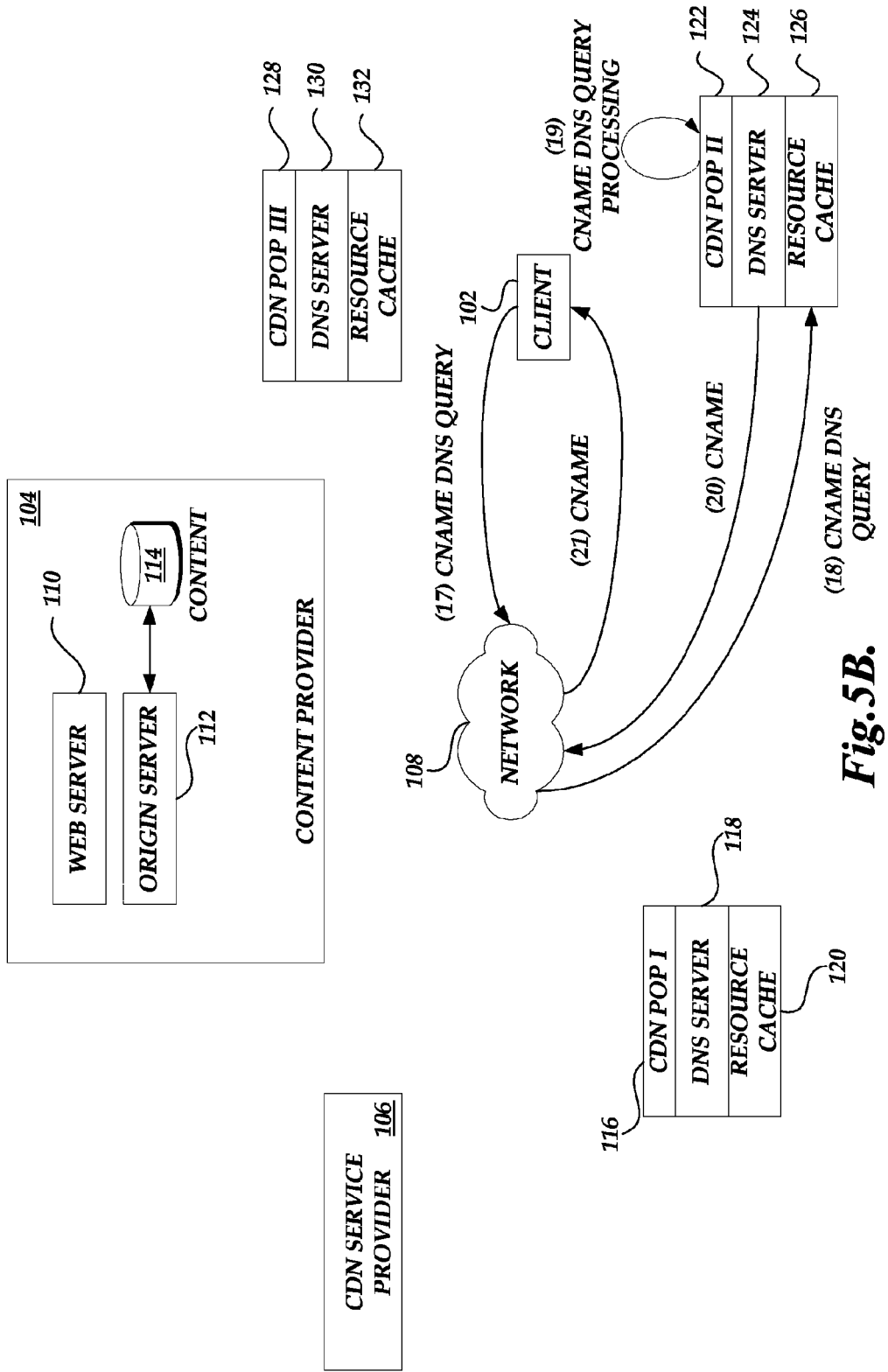
Figure 5C:
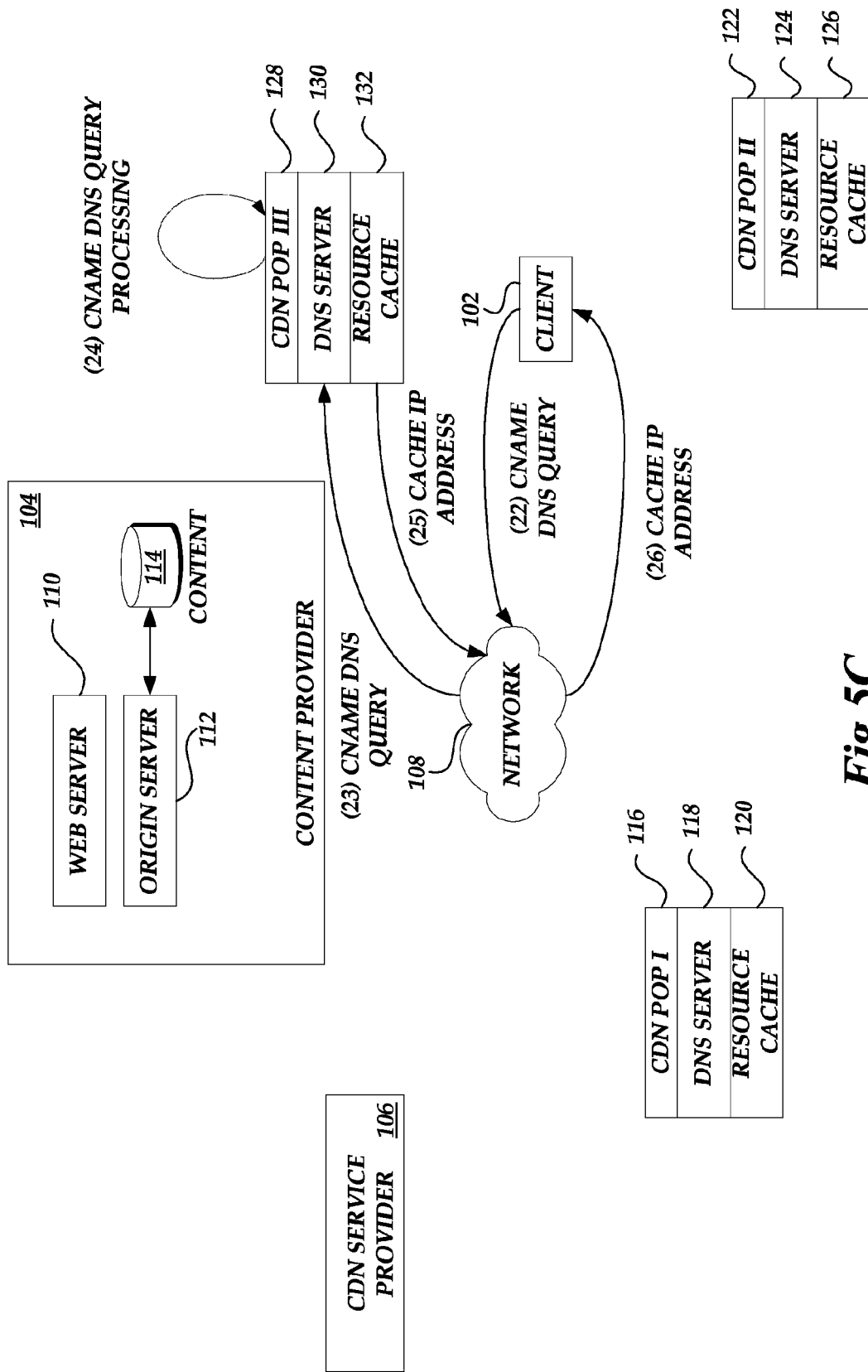

With reference now to FIGS. 5A-5C, as an alternative to selecting a resource cache component upon receipt of a DNS query as described in reference to FIG. 4, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

http://request_routing_information.cdnprovider.com

In an illustrative embodiment, the CNAME records are generated and provided by the DNS servers to identify a more appropriate DNS server of the CDN service provider 106. As with selecting an appropriate resource cache component as described above in reference to FIG. 4, the DNS server receiving the initial DNS query can utilize a variety of information to select a more appropriate DNS server of the CDN service provider 106 to resolve the resource request. In an illustrative embodiment, and as will also be further described below in reference to FIGS. 7 and 8, the DNS server determines a class associated with the requesting client computing device. Again, the class can, for example, correspond to a specific geographic region to which the client computing device belongs or an internet service provider for the client computing device. In any case, the DNS server may obtain class information from the client directly (such as information provided by the client computing device or ISP) or indirectly (such as inferred through a client computing device's IP address). Based on the class, the DNS server determines appropriate routing information. Then, for the embodiments described specifically in reference to FIG. 5A, the DNS server selects an appropriate alternative DNS server for use in resolving the resource request based on the routing information for the determined class of the client computing device. As will also be further described below, the DNS server can further utilize network performance measurements to select specific alternative DNS servers for the determined class.

In accordance with an illustrative embodiment, the DNS server maintains a data store that defines CNAME records for various original URLs. If a DNS query corresponding to a particular original URL matches an entry in the data store, the DNS server returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server, either directly or via a network-based service, selects one of the CNAME records defined in the data store as more appropriate routing information based on logic that factors a determined class of the requesting client computing device. It will be appreciated by one skilled in the art and others that the DNS server can implement further additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have POP specific data stores that define CNAME records, which can be managed centrally by the CDN service provider 106 or locally at the POP 116, 122, 128. Still further, each DNS server computing device within the DNS server components 118, 124, 130 can utilize shared data stores managed by a respective POP or a local data store specific to an individual DNS server computing device.

The returned CNAME can also include request routing information that is different from or in addition to the information provided in URL/CNAME of the current DNS query. For example, if the CNAME selection is based on a class associated with the requesting client computing device, a specific class can be identified in the "request_routing_information" portion of the specific CNAME record. A similar approach could be taken to identify service level plans and file management by including a specific identifier in the "request_routing_information" portion of the CNAME record. In another embodiment, request_routing information can be found in the identification of a CDN service provider 106 domain different from the domain found in the current URL/CNAME. For example, if the CNAME is based on a regional plan, a specific regional plan domain (e.g., "cdnprovider-region1.com") could be used in the domain name portion of the specific CNAME record. Any additional request routing information can be prepended to the existing request routing information in the current URL/CNAME such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is selected by the DNS server component 118.

With continued reference to FIG. 5A, one skilled in the relevant art will appreciate that the DNS server may select (or otherwise obtain) a CNAME record that is intended to resolve to a more appropriate DNS server of the CDN service provider 106. It may be possible, however, that the same DNS server would also be authoritative for the subsequent DNS query for the CNAME to be provided to the client computing device. For example, a specific DNS server may be authoritative for both a specific regional plan and a service level plan. Thus, returning a CNAME would still result in the DNS query arriving at the same DNS query (which may also be due in part to the client computing device's geography). In such an embodiment, the DNS server, such as DNS server component 118, may choose to resolve the future DNS query in advance With reference now to FIG. 5B, upon receipt of the CNAME from the DNS server component 118, the client computing device 102 generates a subsequent DNS query corresponding to the CNAME. As previously discussed with regard to FIG. 4, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 5A) and the previous URL/CNAME share common CDN service provider domains, the current CNAME DNS query resolves to a different POP provided by the CDN service provider 106. As illustrated in FIG. 5B, the DNS server component 124 of POP 122 receives the current CNAME based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manners described above.

For purposes of illustration, assume that the DNS server component 118 determines that the DNS query corresponding to the current CNAME (provided by DNS server component 116) also corresponds to a CNAME record in its data store. In such an example, the DNS server component 124 would do any necessary processing to select a specific CNAME as described above and return the CNAME to the client computing device. With reference now to FIG. 5C, the client computing device 102 would now transmit a second subsequent DNS query corresponding to the CNAME provided by DNS server component 124 (FIG. 5B). In accordance with DNS query processes already described, the DNS query would illustratively be received by the DNS server component 130 of POP 128. Again, the DNS server component 130 can then determine whether to resolve the DNS query on the CNAME with an IP address of a cache component that will process the content request or whether to provide another alternative resource identifier selected in the manners described above. In this example, the DNS server component 130 returns an IP address.

With continued reference to FIG. 5C, in an illustrative embodiment, the DNS server components, such as DNS server component 130, can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. Yet further, the DNS server components can select a resource cache component based on routing information for a class of the requesting client computing device as described in reference to FIG. 4. Again, the IP address selected by a DNS server component may correspond to a specific caching server in the resource cache. Alternatively, the IP address can correspond to a hardware/software selection component (such as a load balancer).

Figure 6:
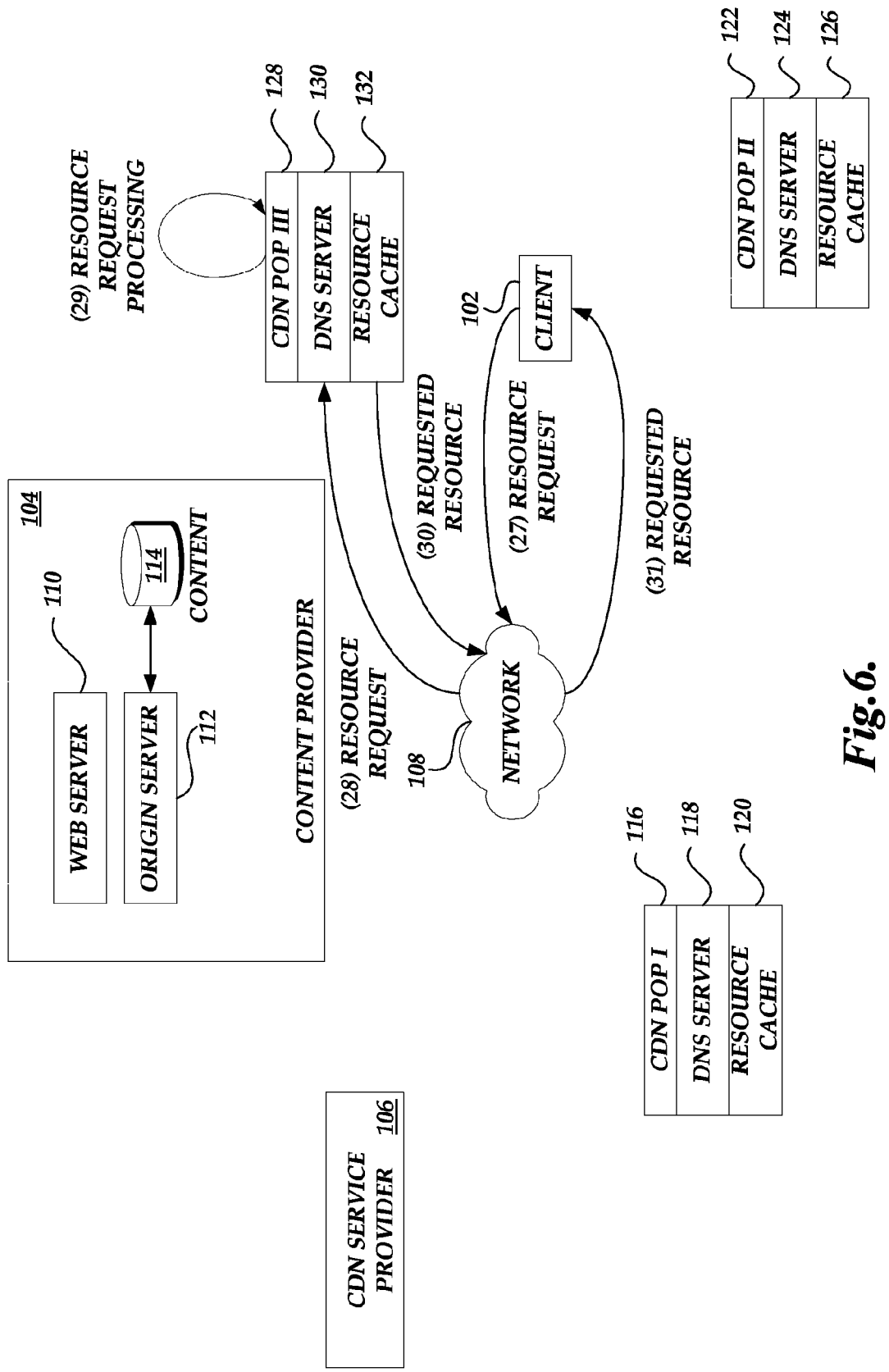
FIG. 6 is a block diagram of the content delivery environment of FIG. 1 illustrating the generation and processing of embedded resource requests from a client computing device to a content delivery network service provider.

With reference now to FIG. 6, in an illustrative example, assume that the DNS server component 130 has selected the resource cache component 132 of POP 128. Upon receipt of the IP address for the resource cache component 132, the client computing device 102 transmits requests for the requested content to the resource cache component 132. The resource cache component 132 processes the request in a manner described above and the requested content is transmitted to the client computing device 102.

Figure 7:
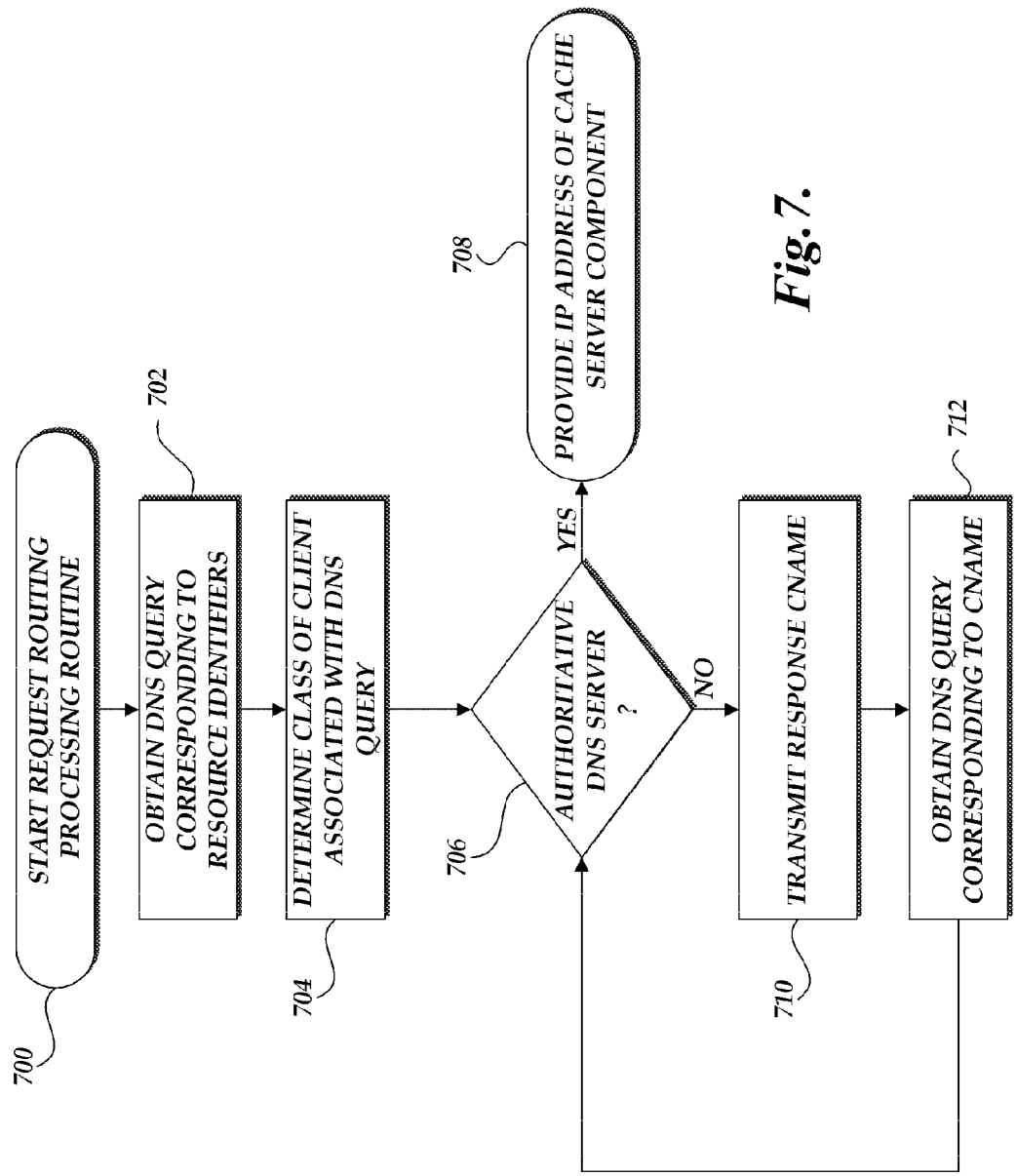
FIG. 7 is a flow diagram illustrative of a request routing routine implemented by a content delivery network service provider for selecting a cache server component.

With reference now to FIG. 7, one embodiment of a routine 700 implemented by the CDN service provider 106 for processing a resource request will be described. One skilled in the relevant art will appreciate that actions/steps outlined for routine 700 may be implemented by one or many computing devices/components that are associated with the CDN service provider 106. Accordingly, routine 700 has been logically associated as being generally performed by the CDN service provider 106, and thus the following illustrative embodiments should not be construed as limiting.

Routine 700 can apply to embodiments described both in reference to FIG. 4 and FIGS. 5A-5C. As such, routine 700 will first be described in reference to embodiments corresponding to selecting resource cache components at DNS servers based on routing information for a class of the requesting client computing device, as generally described in reference to FIG. 4.

At block 702, one of the DNS server components 118, 124, 130 receives a DNS query corresponding to a resource identifier. As previously discussed, the resource identifier can be a URL that has been embedded in content requested by the client computing device 102 and previously provided by the content provider 104. The DNS server determines a class of the requesting client associate with the DNS query at block 704. As mentioned above, the class can, for example, correspond to a specific geographic region to which the client computing device belongs or an internet service provider for the client computing device. Such class information can be determined from the client directly (such as information provided by the client computing device or ISP) or indirectly (such as inferred through a client computing device's IP address). In an illustrative embodiment, the determination of class at block 702 can specifically include associating the requesting client computing device to a cluster of other client computing devices based on a variety of criteria. Such criteria can include geographic region and internet service provider data, as mentioned above, in addition to routing path information, networking equipment, client sponsored service level agreements, content provider service level agreements, and the like.

At a decision block 706, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. In this illustrative embodiment, there are no CNAME records. Accordingly, the routine continues at block 708 where, in general, the current DNS server determines routing information for the determined class. Specifically, in an illustrative embodiment, the DNS server selects an appropriate resource cache component for providing content associated with the resource request based on routing information for the determined class of the client computing device. The DNS server then provides the IP address of the selected resource cache component to the client computing device.

In an illustrative embodiment, the routing information can be a list of resource cache components that can service the content request for a particular class of client computing devices. The DNS server can use a variety of logic to select a resource cache component from the list. In one embodiment, a probability of selecting each resource cache component on the list can be defined, and the DNS server selects a resource cache component based on these probabilities. Accordingly, in this illustrative embodiment, a DNS server will select a resource cache component on a frequency corresponding to the determined probabilities. For example, the DNS server will most frequently select the resource cache component with the highest probability of selection, but can also, at times, select a resource cache component with a lower probability of selection. In this case, the probabilities correspond to anticipated performance of the selected computing device. As will be described further below, the CDN service provider 106 can monitor performance of delivering requested resources to clients in a particular class and thereafter update the routing information (e.g., probabilities) accordingly. In another embodiment, the probabilities can correspond to load shedding or other network traffic mitigation. By periodically selecting a non-preferred resource cache component and monitoring its performance for the class, the CDN service provider 106 can thus determine if changes to the routing information for the class are desirable.

It will be appreciated by one skilled in the relevant art that a number of algorithms or selection logic can be used for selecting a resource cache component to service the resource request from a particular class of client computing devices. For example, in addition to the frequency-based reinforcement algorithm described above, the DNS server may implemented alternative reinforcement learning algorithms. Examples of other reinforcement algorithms include, but are not limited to, algorithms such as State-Action-Reward-State-Action (SARSA),Q-learning, delayed Q-learning, and the like. Additionally, other machine learning approaches, such as support vector machines, neural networks, Bayesian engines, etc. may be utilized in conjunction with a DNS server to select the appropriate resource cache component.

Next, embodiments in which routing information for a class of the requesting client computing device is used to select an appropriate DNS server for processing the request will be described. In such embodiments, routine 700 similarly commences at block 702 where one of the DNS server components 118, 124, 130 receives a DNS query corresponding to a resource identifier. As described above, the DNS server further determines a class of the requesting client computing device associated with the DNS query at block 704.

At decision block 706, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. Alternative or additional methodologies may also be practiced to determine whether the DNS server is authoritative.

If the current DNS server is authoritative (including a determination that the same DNS server will be authoritative for subsequent DNS queries), the current DNS server resolves the DNS query by returning the IP address of cache server component. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 704 the DNS server is not authoritative, at block 708, the DNS server component selects and transmits an alternative resource identifier. As described above, the DNS server component can utilize a data store to identify a set of potential candidate CNAMES as a function of the current DNS query. The DNS server then, either directly or via a network-based service, selects one of the CNAME records defined in the data store as more appropriate routing information based on logic that factors a determined class of the requesting client computing device. At block 710, different DNS server components 118, 124, 130 receive a DNS query corresponding to the CNAME. The routine 700 then returns to decision block 704 and continues to repeat as appropriate.

In an illustrative embodiment, where the DNS server is not authoritative, the routing information can be a set or list of potential candidate CNAMES which correspond to one or more DNS servers that can service the content request for a particular class of client computing devices. Similar to selecting a cache resource component as described above, the DNS server can use a variety of logic to select a CNAME, or another DNS server, from the list. In one embodiment, a probability of selecting each CNAME in the set can be initially defined in a number of ways, and the DNS server selects a CNAME based on the defined probabilities. Accordingly, in this illustrative embodiment, a DNS server will most frequently select the CNAME with the highest probability of selection, but can also, at times, select a CNAME with a lower probability of selection. In this case, the probabilities correspond to anticipated performance of the corresponding computing device. As will be described further below, the CDN service provider 106 can monitor performance of delivering requested resources to clients in a particular class and thereafter update the probabilities. Again, in further embodiments, the probabilities can correspond to load shedding or other network traffic mitigation. By periodically selecting a non-preferred CNAME and monitoring performance of the corresponding DNS server for the class, the CDN service provider 106 can thus determine if changes to the routing information for the class are desirable. It will be appreciated by one skilled in the relevant art that a number of algorithms or selection logic can be used for selecting a CNAME/DNS server to service the resource request from a particular class of client computing devices.

Figure 8:
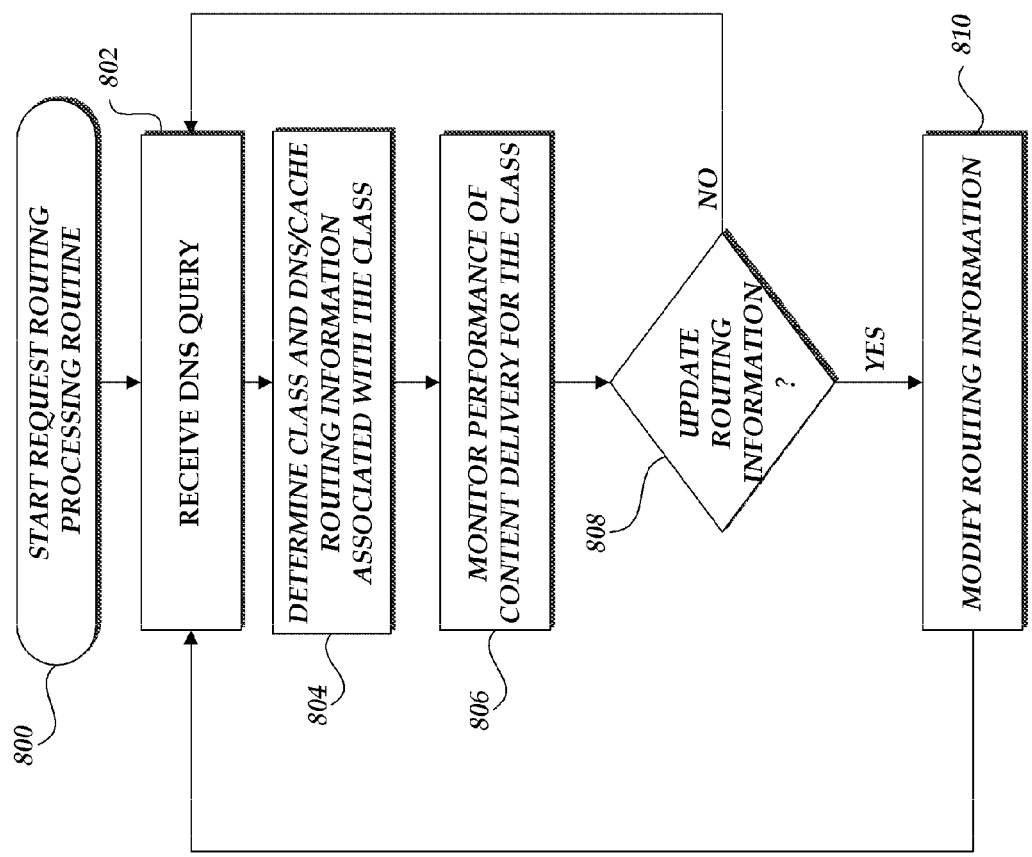
FIG. 8 is a flow diagram illustrative a request routing routine implemented by a content delivery network service provider for updating routing information.

With reference now to FIG. 8, one embodiment of a request routing routine 800 for updating routing information will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At a block 802, a first DNS server of the CDN service provider 106 receives a DNS query corresponding to a requested resource from a client computing device. As similarly described above in reference to block 704 of FIG. 7, the DNS server at block 804 determines a class corresponding to the requesting client and associated with the DNS query. Also at block 804, the DNS server determines either DNS or cache routing information based on the determined class of the client computing device as similarly described above. The routine 800 continues at block 806 where network performance criteria associated with delivery of the requested resource is monitored. The network performance criteria can correspond to measurements of network performance for transmitting data from the CDN service provider POPs to the client computing device 102. In one embodiment, network data transfer latencies associated with the delivery of the requested resource are measured by the client computing device 102. Alternatively, the CDN service provider 106, such as through the resource cache component, can measure the performance as part of providing content to a client computing device. Such network performance data can be managed and maintained globally by the CDN service provider and shared with the DNS servers of the CDN or individually by the DNS servers of the CDN service provider. Moreover, network performance criteria can be provided as a batch process from POPs or sent in response to a request from one POP to another.

With continued reference to FIG. 8, at a test block 808, a determination is made as to whether an update to the routing information for the identified class is needed based on the performance data. In one embodiment, the update determination can be made by the CDN service provider globally or by the individual DNS service components or DNS servers. In an illustrative embodiment where individual DNS servers determine whether to update routing information for a class, each DNS server can manage and maintain routing information for the identified class unique to the particular DNS server. In this illustrative embodiment, the performance data can be maintained globally by the CDN service provider and shared with the DNS components and/or DNS servers, with each DNS component and/or DNS server managing how the performance data is used. Accordingly, routing information for a class may vary from one DNS component/server to another.

Returning to FIG. 8, if an update is needed, the routing information for the identified class is modified at block 810. In one embodiment, the CDN service provider 106 modifies a list of computing devices (e.g. DNS components/servers and/or resource cache components) for servicing a resource request from a particular class of client computing devices 102. In another embodiment, the CDN service provider and/or specific DNS components/servers can maintain and modify probabilities of selection of particular computing devices for servicing a resource request for a class of client computing devices. For example, if performance data indicates that a DNS server and/or a resource cache component which has a lower probability of selection has performed well, the probability of selection may be increased so that the particular DNS server and/or resource cache component will be selected more frequently for servicing a resource request from a client computing device. After a modification has been made at block 810, or if an update is not needed at block 808, the routine 800 returns to block 802 for further processing as described above.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGUREs should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
under control of one or more configured computing systems of a content delivery network (CDN) service,
obtaining a Domain Name System (DNS) query from a client computing device at a first DNS server, wherein the DNS query corresponds to a requested resource and wherein the first DNS server corresponds to the CDN service;
associating the client computing device with a cluster of other client computing devices;
determining routing information for the associated cluster of the client computing device; and
selecting a cache component of the CDN service for providing the requested resource based on the determined routing information, wherein the determined routing information includes a frequency defined by probabilities of selection for each cache component identified in the determined routing information for the associated cluster.

2. The method as recited in claim 1, wherein selecting the cache component comprises selecting the cache component having a lower probability of selection.

3. The method as recited in claim 2 further comprising:
monitoring performance associated with delivery of the requested resource using the cache component having the lower probability of selection; and
modifying the probability of selection of the cache component having the lower probability of selection for the cluster based on the delivery performance.

4. The method as recited in claim 1, wherein selecting the cache component comprises selecting a non-preferred cache component for providing the requested resource.

5. The method as recited in claim 4 further comprising:
monitoring performance associated with delivery of the requested resource to the non-preferred cache component; and
modifying the routing information for the cluster based on the delivery performance of the requested resource using the non-preferred cache component.

6. The method of claim 1 further comprising:
determining whether the first DNS server is authoritative to resolve the DNS query; and
if not, selecting a second DNS server for processing the resource request based on the routing information for the cluster of the client computing device.

7. The method as recited in claim 6 further comprising:
monitoring performance associated with delivery of the requested resource using the second DNS server; and
modifying the routing information for the cluster based on the delivery performance of the requested resource using the second DNS server.

8. The method as recited in claim 7, wherein modifying the routing information for the cluster comprises modifying a list of DNS servers for processing the resource request for the cluster.

9. The method as recited in claim 8, wherein modifying the routing information for the cluster comprises modifying probabilities of selection of particular DNS servers used for processing the resource request for the cluster.

10. A system comprising:
a first network point of presence associated with a content delivery network (CDN) service, wherein the first network point of presence includes a Domain Name System (DNS) server that receives a DNS query from a client computing device, wherein the DNS query corresponds to a requested resource, and wherein the DNS server in the first network point of presence is operable to:
associate the client computing device with a cluster of other client computing devices;
determine routing information for the associated cluster of the client computing device; and
select a cache component of the CDN service for providing the requested resource based on the determined routing information, wherein the determined routing information includes a frequency defined by probabilities of selection for each cache component identified in the determined routing information for the associated cluster.

11. The system as recited in claim 10, wherein selecting the cache component comprises selecting the cache component having a lower probability of selection.

12. The system as recited in claim 11, wherein the DNS server in the first network point of presence is further operable to:
monitor performance associated with delivery of the requested resource using the cache component having the lower probability of selection; and
modify the probability of selection of the cache component having the lower probability of selection for the cluster based on the delivery performance.

13. The system as recited in claim 10, wherein selecting the cache component comprises selecting a non-preferred cache component for providing the requested resource.

14. The system as recited in claim 13, wherein the DNS server in the first network point of presence is further operable to:
monitor performance associated with delivery of the requested resource to the non-preferred cache component; and
modify the routing information for the cluster based on the delivery performance of the requested resource using the non-preferred cache component.

15. The system of claim 10, wherein the DNS server in the first network point of presence is further operable to:
determine whether the first DNS server is authoritative to resolve the DNS query; and
if not, select a second DNS server for processing the resource request based on the routing information for the cluster of the client computing device.

16. The system as recited in claim 15, wherein the DNS server in the first network point of presence is further operable to:
monitor performance associated with delivery of the requested resource using the second DNS server; and
modify the routing information for the cluster based on the delivery performance of the requested resource using the second DNS server.

17. The system as recited in claim 16, wherein modifying the routing information for the cluster comprises modifying a list of DNS servers for processing the resource request for the cluster.

18. The system as recited in claim 17, wherein modifying the routing information for the cluster comprises modifying probabilities of selection of particular DNS servers used for processing the resource request for the cluster.

19. A method comprising:
under control of one or more configured computing systems of a content delivery network (CDN) service,
obtaining a Domain Name System (DNS) query from a client computing device at a first DNS server, wherein the DNS query corresponds to a requested resource and wherein the first DNS server corresponds to the CDN service;
associating the client computing device with a cluster of other client computing devices;
determining whether the first DNS server is authoritative based on routing information for the associated cluster of the client computing device; and
if not, selecting a second DNS server for processing the resource request based on the routing information for the associated cluster of the client computing device, wherein the routing information includes a frequency defined by probabilities of selection for each DNS server identified in the routing information for the associated cluster.

20. The method as recited in claim 19, wherein selecting the second DNS server comprises selecting the DNS server identified in the routing information having a lower probability of selection.

21. The method as recited in claim 20 further comprising:
monitoring performance associated with delivery of the requested resource using the second DNS server having the lower probability of selection; and modifying the probability of selection of the second DNS server having the lower probability of selection for the cluster based on the delivery perfollnance.

22. A system comprising:
a first network point of presence associated with a content delivery network (CDN) service, wherein the CDN service includes one or more cache servers to provide the requested resource and wherein the first network point of presence includes a first Domain Name System (DNS) server that receives a DNS query from a client computing device, wherein the DNS query corresponds to a requested resource associated with a first resource identifier, and wherein the DNS server in the first network point of presence is operable to:
associate the client computing device with a cluster of other client computing devices;
determine whether the first DNS server is authoritative based on routing information for the associated cluster of the client computing device; and
if not, select a second DNS server for processing the resource request based on the routing information for the associated cluster of the client computing device, wherein the routing information includes a frequency defined by probabilities of selection for each DNS server identified in the routing information for the associated cluster.

23. The system as recited in claim 22, wherein selecting the second DNS server comprises selecting a non-preferred DNS server identified in the routing information.

24. The system as recited in claim 23, wherein the first DNS server in the first network point of presence is further operable to:
monitor performance associated with delivery of the requested resource using the non-preferred DNS server; and
modify the routing information for the cluster based on the delivery performance of the requested resource using the non-preferred DNS server.

* * * * *